United States Patent Office 3,218,335
Patented Nov. 16, 1965

3,218,335
ANTIBIOTIC COMPOUNDS
Muzio Scevola, Milan, Italy, assignor to Laboratori
Pro-Ter S.p.A., Milan, Italy
No Drawing. Filed Nov. 8, 1963, Ser. No. 322,509
3 Claims. (Cl. 260—326.3)

This is a continuation-in-part of application Serial No. 143,569, filed October 9, 1961, now abandoned.

This invention relates to antibiotic compounds.

An object of this invention is to provide antibiotic compounds characterized by an extraordinary activity against bacteria such as *Escherichia coli, Staph. aureus, Bac. subtilis, Sarcina lutea, Klebsiella pneumoniae*.

A further object of this invention is to provide such antibiotic compounds in a highly water-soluble form, capable of being readily absorbed by human organism.

A still further object is to provide said antibiotic compounds of a substantially non-toxic character.

A particular object of this invention is to provide a method for preparing said antibotic compounds.

The compounds according to this invention are characterized by a general formula:

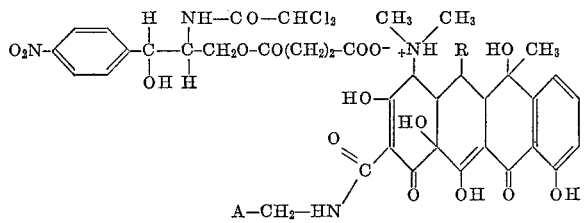

wherein A stands for an amino group derived from a primary- or secondary amino group (advantageously dibenzylamino- or pyrrolidino group) of aliphatic or heterocyclic series, and R is a hydrogen atom or hydroxyl group.

A particularly advantageous compound of the above-reported general formula has the formula:

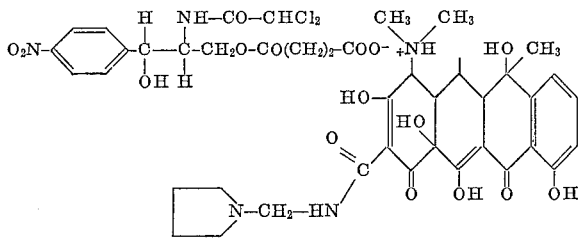

which is derived from the general formula by making:

and R=H

The process for producing the above disclosed antibiotic compounds broadly consists of a salification reaction between the carboxy group of D- (—)- threo-2-dichloroacetamino-1-p-nitrophenyl-1,3-propanediol succinic acid mono-ester (chloroamphenicol succinic acid monoester) and the 4-amino group of a 4-dimethylamino-1,4,4a,5a,6,11,12a - heptahydro - 3,6,10,12,12a - pentahydroxy-5,R-6-methyl-1,11-dioxy - 2 - naphthacenecarboxyamidomethylamine (a tetracycline amino-methyl derivative), wherein R is hydrogen atom or hydroxy group.

The apparently simplest way comprises contacting said mono-ester and said naphthacenecarboxyamidomethylamine in water (or in other suitable solvent) thereby to react the free carboxy group of the mono-ester with the 4-amino group of said amine.

Alternatively, a double-exchange reaction can be carried out between a water-soluble salt of said mono-ester (the sodium salt, for example) and a salt (citrate, for example) of the N'-amino-methyl-naphthacenecarboxyamide.

According to a still further embodiment, the N'-amino-methyl-naphthacenecarboxyamide is aminomethylated in an anhydrous solvent in the presence of formaldehyde or paraformaldehyde, and the aminomethylation product is reacted in the same solvent with the succinic acid monoester.

EXAMPLE 1

10.54 g. (0.02 mol) 4-dimethylamino-1,4,4a,5,5a,6,11,-12a-octahydro-3,6,10,12,12a-pentahydroxy-6-methyl-1,11-dioxy-2-naphthacenecarboxyamido-methyl-pyrrolidine are dissolved in 00 ml. distilled water at room temperature; energic stirring is then applied and 8.46 g. (0.02 mols) D-(—)-threo-2-dichloroacetamido-1-p - nitrophenyl - 1,3-propanediol succinic acid mono-ester are dissolved by small amounts in the pyrrolidine solution.

A clear solution is obtained, which can be decolored on charcoal (if necessary) and is then lyophilized.

The salification reaction product is a bright-yellow, highly water-soluble powder; it melts at 140–144° C. (with decomposition) and is insoluble in ethyl ether, ligroin and hexane. The yield is 17.5 g.

Analysis (anhydrous product):
  N% calculated _____ 7.47
  N% found _____ 7.36

EXAMPLE 2

13.86 g. (0.02 mol) 4-dimethylamino-1,4,4a,5,5a,6,11,-12a-octahydro-3,5,6,10,12,12a - hexahydroxy - 6 - methyl-1,11-dioxy-2-naphthacenecarboxyamido-methyl - dibenzylamine hydrochloride are dissolved in 100 ml. distilled water at room temperature; energic stirring is then applied and a solution of 8.46 g. (0.02 mol) sodium salt of D-(—)-threo - 2 - dichloroacetamido - 1 - p-nitrophenyl - 1,3-propanediol succinic acid monoester in 50 ml. distilled water is added.

The obtained solution is gelated and then lyophilized. The lyophilized product is crystallized in anhydrous butanol and dried by means of phosphoric anhydride. The yield is 12 g. The product is in the form of a bright-yellow powder, highly soluble in water, ethyl alcohol and acetone.

Analysis (anhydrous product):
  N% calculated _____ 7.5
  N% found _____ 7.16

EXAMPLE 3

88.8 g. (0.2 mol) anhydorus 4-dimethylamino-1,4,4a,5,5a,6,11,12a - octahydro - 3,6,10,12,12a-pentahydroxy-6-methyl - 1,11 - dioxy - 2 - naphthacenecarboxyamide are dissolved, while stirring, in 1,200 ml. absolute ethyl alcohol. To the obtained solution 14.2 g. pyrrolidine and 28 ml. aqueous formaldehyde at 36.7% (0.2 mol) are added drop-by-drop while operating in a gaseous nitrogen stream. After about 2 hours, 84.6 g. (0.2 mol) D-(—)threo - 2 - dichloroacetamido - 1 - p - nitrophenyl-1,3-propanediol succinic acid monoester dissolved in 300 ml. absolute ethyl alcohol are added. Stirring is applied for about 60 minutes at least, whereupon 500 ml. anhydrous ethyl ether are added with precipitation of a solid product. The precipitate is recovered by filtration and is washed on the filter twice with anhydrous ethyl ether. After vacuum-drying and a subsequent $P_2O_5$-drying, the product weights 149 g. It is in the form of a bright-yellow powder of bitter taste, very soluble in water and in common organic solvents, insoluble in ethyl ether and hexane, and melts at 140–144° C. with decomposition.

Analysis for $C_{42}H_{49}O_{16}N_5Cl_2$ (mol. weight 950.3)—

Calculated: C, 53%; H, 5.15%; O, 26.9%, N, 7.36%.
Found: C, 53.9%; H, 5.01%; O, 26.5%; N, 7.95%.

The compounds according to this invention possess several advantageous and unexpected properties. Firstly, they offer a possibility of simultaneously administering to a patient two powerful antibiotic moieties (tetracycline and chloramphenicol) forming a single molecule very soluble in water, so that the moieties are absorbed by equal amounts upon administration. As compared with prior compounds and compositions, the instant compounds lead to high haematic levels within a short period of time. This results in a highly effective activity of a persistent nature, a largely exceeding that of both tetracycline and chloramphenicol taken either alone or in a mutual association. Still moreover, no assuefaction or undesirable collateral effects have been noted in clinical experimentation of the instant compounds.

The antibiotic activity in vitro of the compound of Formula (II) disclosed hereinbefore has been tested by the test glass method, in order to define the bacteriostatic minimum dose of the compound. Test glasses were used each of which contained 4.5 ml. Difco nutritive broth and 0.5 ml. culture (24 hours old) on agar (dilution 1:50) of selected microbic species listed in the following Table 1.

The test results were read 24 hours later on the tests glasses maintained at 37° C. The antibiotic compound was tested in respect of each species by progressively increasing doses. Table 1 reports the values of the minimum bacteriostatic doses in I.U./ml. culture.

*Table 1*

| Species of bacteria: | Min. dose I.U./ml. |
|---|---|
| *Escherichia coli* VP | 7.000 |
| *Klebsiella pneumoniae* 10031 | 0.450 |
| *Escherichia coli* F 42 McQuinn | 0.300 |
| *Escherichia coli* 95 | 0.100 |
| Proteus X2 6897 ATCC | 0.100 |
| *Sarcina lutea* 9341 ATCC | 0.070 |
| Staph. Oxford 74 | 0.070 |
| *Staph. aureus* 6538 P | 0.030 |
| *Bac. subtilis* 6633 ATCC | 0.015 |
| *Staph. silv.* 12 | 0.015 |

The values listed in the table show that the compound (II) exhibits a marked bacteriostatic activity in respect of an appreciably wide range of microbic species of both gram-negative and gram-positive schizomycetes; also microbes of the pyemic coccii group were found to be particularly sensitive to the compound.

Preliminary tests of the antibiotic activity of human subjects were carried out on masculine subjects, of generally normal type, to whom the compound (II) was administered once by a dose of 300 mg. by deep intramuscular injection. During the subsequent 36 hours blood samples were taken from the subjects at the elbow vein at spaced intervals of time. Upon coagulation the serum was obtained for the determination of the antibiotic power. A stock of Oxford 74 Staphylococcus was employed as microbic species. Determination of the antibiotic power of the serum was performed by the pool method. The average results are reported in the following Table 2:

*Table 2*

| Hours after administration: | Compound (II) concentration in serum (gamma/ml.) |
|---|---|
| 1 | 1.00 |
| 2 | 0.70 |
| 3 | 0.70 |
| 6 | 0.50 |
| 8 | 0.40 |
| 12 | 0.30 |
| 24 | 0.15 |
| 36 | 0.10 |

Table 2 shows that the compound (II) proportion in the serum after 36 hours is still sufficient to exert a bacteriostatic control on Oxford 74 Staphylococcus (compare the 0.070 value in Table 1). Moreover, checking of the subjects disclosed that the compound does not lead to pathologic manifestations of either a subjective or objective character.

Clinical tests have subsequently been carried out on compound (II) by using preparations comprising lyophilized 300 mg. dosees of the compound and annexed solvent phials, suitable for both intramuscular and intravenous injection.

The following Table 3 relates to fourteen subjects, all of feminine sex, infected by broncho-pleuro-pneumonia (subjects Nos. 2, 3, 4, 5, 6, 9, 13), broncho-pneumonia processes complicated by cystitis (No. 7), phlogistic processes on the pharynx (No. 14), on the veins of the lower limbs (Nos. 8 and 11), on the biliary system (No. 1) and on the urinary system (Nos. 10 and 12).

The treatment of the subjects was undertaken after an unsuccessful attempt at treatment with other antibiotics, such as penicillin, chloramphenicol and tetracycline. The antibiotic compound was employed over various periods, ranging between 4 and 12 days. In most cases an intramuscular phial was administered once daily; in one case (No. 14) two intramuscular phials daily were administered; finally, in two cases (Nos. 8 and 9) one phial daily was administered by intravenous injection.

*Table 3*

| Case No. | Age | Clinical diagnosis | Treatment by PTC | Effects |
|---|---|---|---|---|
| 1 | 76 | Long date lithiasic cystopathia; acute colecystits and probable hepatocholangeitis; hepatorenal syndrome (regressive). | 1 intramuscular phial during ten days. | Fever disappeared, gastric tolerance resumed; subicter disappeared, diuresia resumed; bilirubin normalized regression of leucocytosis; initial cylindruria disappeared. |
| 2 | 44 | Right hylum-pneumonic neoplasia. Atelectasis of right middle lower lobe in the course of abscessual evolution. | 1 intramuscular phial daily during 6 days. | Decrease in temperature and cough; improvement of the characters of bronchial secretion. Antiobiogramme: germs resisting penicillin, streptomycin, tetracycline but slightly sensitive against CAF. |
| 3 | 50 | Recrudescent bronchitis. Rhinosinusitis sequelae. Asthmatic syndrome. | 1 intramuscular phial during 5 days. | Fever disappeared, reduction in bronchial secretion. Antibiogramme: germs resisting penicillin and tetracycline. |
| 4 | 52 | Recrudescent bronchitis. Pneumonectasis. Luetic aortitis. | 1 intramuscular phial during 4 days. | Fever disappeared. Secretion gradually reduced. Antibiogramme: germs resisting penicillin and of low sensitiveness against CAF. |
| 5 | 67 | Right bronchopneumonia in hypertensive miocardium sclerotic feminine subject. Left ventricular deficiency. | 1 intramuscular phial during 5 days. | Regression and disappearance of focus. Fever disappeared on third day. Antibiogramme: resistance against penicillin. |
| 6 | 60 | Miocardium aortosclerosis. Cerebral vasculophaty. Left hemiplegia. Left broncopneumonia. | 1 intramuscular phial during 8 days. | Fever disappeared in seven days. Gradual reduction of pneumonic addensate. Antibiogramme: resistance against penicillin, sulphamides and tetracycline. |
| 7 | 77 | Cerebral vasculophaty. Left hemiplegia, right bronchopneumonia. Cystitis. | 1 intramuscular phial during ten days. | Fever disappeared in 8 days. Improvement of the urinary aspect. Antibiogramme: satisfactory sensitiveness against antibiotics both before and after treatment. |
| 8 | 42 | Thrombophlebitis of the lower left limb. | 1 intravenous phial during 10 days. | Fever disappeared in 6 days. Local regression in 10 days. Regression of leucocytosis. Vene section (V. S.) in course of normalisation. |

Table 3—Continued

| Case No. | Age | Clinical diagnosis | Treatment by PTC | Effects |
|---|---|---|---|---|
| 9 | 65 | Progressed mitral cardiopathy. Cardio aortic sclerosis. Congestive heart deficiency. Hypostatic bronchopneumonia. | 1 intravenous phial during 7 days. | Fever disappeared in 7 days. Slow disappearance of basilar lung affection. Regression of heart deficiency. |
| 10 | 58 | Progressed cholecystostomy. Diabetes mellitus. Recent right renal colic. Cystopyelitis. | 1 intramuscular phial during 8 days. | Disappearance of the cystopyelitic aspect and fever. Normalisation of leucocytosis. Disappearance of pyuria. |
| 11 | 59 | Miocardia sclerosis in obese subject. Thrombophlebitis of the right lower limb. | 1 intramuscular phial during 9 days. | Regression of the thrombophlebitic process and temperature in ten days. Normalized V. S. and leucocytes. |
| 12 | 72 | Sequelae of hysterectomy. Enterogenous cystitis. Cystocele. | 1 intramuscular phial during 6 days. | Disappearance of fever in 3 days. Disappearance of dysuria in 5 days. Normalized V. S. Normalization of the urinary report in 3 days. |
| 13 | 43 | Right pleuropneumonia | 1 intramuscular phial during 12 days. | Disappearance of fever, regression of pneumonic addensate. Decrease in V. S. Preliminary antibiogramme: resistance against penicillin and tetracycline. |
| 14 | 26 | Right peritonsillar phlegmon. Lipothymia. | 2 intramuscular phials during 4 days. | Absence of fever after 3 days. General improvement. Regressed initial leucocytosis. V. S. in course of normalization. |

Local and general tolerance to the antibiotic compound was excellent in all cases reported in Table 3. Side effects were almost absent; in Case No. 6 only glossitis of deficiency type of a certain importance was noted. Where the antibiogram was repeated after treatment, the bacterial sensitiveness to antibiotics was not found to be modified and no habit of the germs to the compound was ascertained.

What I claim is:

1. Antibiotic compounds of the formula:

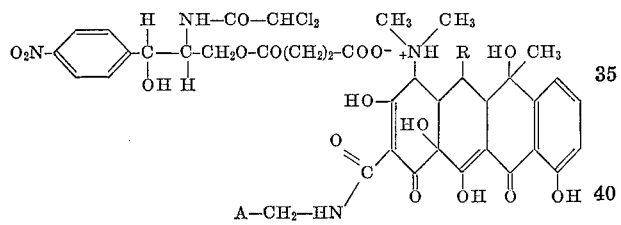

wherein A is an amino group derived from an amine selected from the class consisting of primary and secondary, aliphatic and heterocyclic amines, and wherein R is selected from the class consisting of hydrogen atom and hydroxyl group.

2. Antibiotic compounds of the formula:

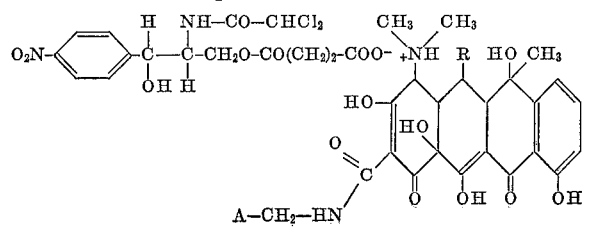

wherein A is selected from the class consisting of dibenzylamine and pyrrolidine, and wherein R is selected from the class consisting of hydrogen atom and hydroxyl group.

3. Antibiotic compound of the formula:

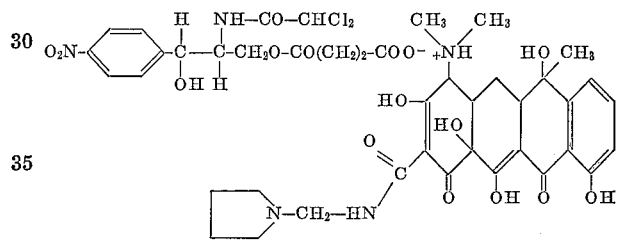

References Cited by the Examiner

UNITED STATES PATENTS

| | | | |
|---|---|---|---|
| 2,734,919 | 2/1956 | Amiard et al. | 260—562 X |
| 2,824,877 | 2/1958 | Cheney et al. | 260—559 X |
| 2,837,513 | 6/1958 | Gailliot et al. | 260—559 X |
| 2,997,471 | 8/1961 | Cheney et al. | 260—559 X |
| 3,104,240 | 9/1963 | Cheney et al. | 260—559 X |

FOREIGN PATENTS 513,248   5/1955   Canada.

OTHER REFERENCES

Siedel et al.: Munchener Medizinische Wochenschrift, vol. 100, pp. 661–663, 1958.

NICHOLAS S. RIZZO, *Primary Examiner.*